United States Patent [19]

Mahlich

[11] Patent Number: 5,335,588
[45] Date of Patent: Aug. 9, 1994

[54] DEVICE FOR PREPARING MILK FROTH FOR CAPPUCCINO

[75] Inventor: Gotthard Mahlich, Kronberg, Fed. Rep. of Germany

[73] Assignee: Arthur Eugster AG Elektrohaushaltsgeräte, Romanshorn, Switzerland

[21] Appl. No.: 82,468

[22] Filed: Jun. 28, 1993

[30] Foreign Application Priority Data

Jun. 26, 1992 [DE] Fed. Rep. of Germany ....... 4220986

[51] Int. Cl.⁵ .............................................. A47J 31/40
[52] U.S. Cl. ............................ 99/293; 261/DIG. 16; 261/DIG. 76; 261/121.1
[58] Field of Search .............. 99/279, 293, 300, 288, 99/298, 323.1, 323.2, 323.3; 261/DIG. 76, DIG. 17, 121.1

[56] References Cited

U.S. PATENT DOCUMENTS

| | | |
|---|---|---|
| 376,496 | 1/1888 | Roden . |
| 1,406,380 | 2/1922 | Heath et al. . |
| 2,126,625 | 8/1938 | Eggleston . |
| 2,391,422 | 12/1945 | Jackson . |
| 2,521,334 | 9/1950 | Boerstra . |
| 2,989,243 | 6/1961 | Turak . |
| 3,326,472 | 6/1967 | Gjerde . |
| 3,424,547 | 1/1969 | Winniett . |
| 4,466,342 | 8/1984 | Basile et al. . |
| 4,505,431 | 3/1985 | Huffman . |
| 4,552,286 | 11/1985 | Kückens et al. . |
| 4,595,121 | 6/1986 | Schultz . |
| 4,662,993 | 5/1987 | Schaefer ............. 261/DIG. 76 |
| 4,715,274 | 12/1987 | Paoletti . |
| 4,735,133 | 4/1988 | Paoletti . |
| 4,800,805 | 1/1989 | Mahlich ............................ 99/293 |
| 4,945,824 | 8/1990 | Borgmann ............. 261/DIG. 76 |
| 4,960,042 | 10/1990 | Grossi ................. 261/DIG. 16 |

FOREIGN PATENT DOCUMENTS

| | | |
|---|---|---|
| 0251124A2 | 7/1988 | European Pat. Off. . |
| 472272 | 2/1992 | European Pat. Off. . |
| 3538041 | 4/1986 | Fed. Rep. of Germany . |
| 8530296.1 | 5/1986 | Fed. Rep. of Germany . |
| 3632375A | 3/1988 | Fed. Rep. of Germany . |
| 8907183 | 7/1989 | Fed. Rep. of Germany . |
| 3929326 | 3/1990 | Fed. Rep. of Germany . |
| 3942169 | 6/1991 | Fed. Rep. of Germany . |
| 3942713 | 6/1991 | Fed. Rep. of Germany . |
| 665762A5 | 6/1988 | Switzerland . |

Primary Examiner—Robert W. Jenkins
Attorney, Agent, or Firm—Spencer, Frank & Schneider

[57] ABSTRACT

A device is disclosed for the preparation of milk froth for cappuccino (milk-coffee beverage) to be employed as an accessory to coffee or espresso makers or steam preparation machines equipped with a superheated steam generator and a steam pipe. A venturi is disposed at the outlet end of the steam pipe and has an associated air intake conduit and a milk intake conduit that are arranged in such a way that the outlet opening of the air intake conduit and the outlet opening of the milk intake conduit open in the venturi in the zone of greatest subatmospheric pressure. Due to the subatmospheric pressure created in the venturi by the flowing steam, air and milk are sucked in and mixed with the superheated steam in the diffusion path of the venturi. Thus the three-component mixture of steam, air and milk required for the generation of milk froth is created already in the venturi and the desired milk froth is available at the outlet of the venturi.

The device according to the invention is distinguished in that, compared to prior art foaming aids, optimum frothing results are realized even in connection with low power steam generators.

14 Claims, 1 Drawing Sheet

DEVICE FOR PREPARING MILK FROTH FOR CAPPUCCINO

CROSS REFERENCE TO RELATED APPLICATION

This application claims the priority of application Ser. No. P 42 20 986.2, filed Jun. 26, 1992, in the Federal Republic of Germany, the subject matter of which is incorporated herein by reference.

BACKGROUND OF THE INVENTION

The present invention relates to the preparation of milk froth or foam for cappuccino (milk-coffee beverage) by means of superheated steam.

Espresso machines are customarily equipped with devices for generating superheated steam and with a steam discharge pipe for producing milk froth.

To produce milk froth, the outlet opening of the steam pipe which has a reduced cross section and is thus configured as a nozzle, is manually positioned in a vessel filled with milk so that it just contacts the milk surface or slightly dips into the milk. Once the steam cock is opened, the steam jet exiting from the nozzle carries air along from the environment and a steam-air-milk mixture is produced at the liquid interface resulting in the desired milk froth.

This process requires practice and sensitivity on the part of the user since, in order to continuously produce milk froth, the nozzle must always be held in an optimum position relative to the milk surface, which is possible only by skillfully moving the milk containing vessel up and down.

Particularly for home espresso machines, devices for simplifying the preparation of milk froth have therefore been developed and disclosed in which by means of an accessory device for the steam outlet nozzle, the three-component system of steam, air and milk can be produced in such a way that the permanent search for the operating point is no longer required.

One of the prior art devices (DE 3,538,041.A1, Int. Class A 47J31/44, corresponding to U.S. Pat. No. 4,735,133) is composed of a cylinder that is closed at the top and open at the bottom and is placed around the outlet nozzle in the manner of a casing and in which the steam exiting from the nozzle creates subatmospheric pressure. If the bottom portion of the cylinder, which has bores in its casing surface, is immersed below the liquid level of a vessel filled with milk, milk enters the cylinder through the bores and floods the nozzle. Due to the subatmospheric pressure, air is sucked in through a further bore in the upper portion of the cylinder, which remains above the liquid level, and the three-component system of steam, air and milk, and thus the milk froth, is created in front of the steam nozzle within the cylinder to then exit from the cylinder opening. The drawback of this device is that the resulting milk froth has relatively large pores and its consistency is influenced by the fat content of the milk.

In another prior art device (CH 0,673,212.A5, Int. Class A47 J, corresponding to U.S. Pat. No. 4,800,805) the lower open end of an air guiding device is positioned downstream of the exit nozzle in such a way that the outflowing steam surrounds it. The subatmospheric pressure thus created in front of the opening sucks air in through the air guiding device.

When this device is immersed below the liquid level of a vessel filled with milk, the air sucked in through the air guiding device, whose upper opening remains above the liquid level, also produces the steam-air-milk mixture and the milk froth. This device also operates in a very unstable manner, reacts with sensitivity to the sucked-in quantity of air and usually furnishes only large-pored milk froth. In a modified version of this device, the steam outlet pipe is provided with a hollow, downwardly open extension following its nozzle outlet into which open the steam outlet opening of the nozzle as well as the lower opening of the air guiding device which lies downstream thereof toward the open end of the extension. The outflowing steam produces a subatmospheric pressure in the hollow extension and air is sucked in through the air guiding device to be mixed with the steam in the extension. When this device is immersed below the liquid level in a vessel filled with milk, with the upper opening of the air guiding device remaining above the liquid level, the steam-air mixture generated in the extension, once it leaves the opening of the extension, encounters the milk, the steam-air-milk mixture is produced and thus the milk froth.

In a third prior art device (European Patent Application O,195,750.A2, corresponding to U.S. Pat. No. 4,715,274) which, in contrast to the above-described accessory devices, is not immersed into a vessel filled with milk but sucks milk from an external vessel through a conduit, the steam nozzle is followed by a cascade composed of a cylindrical condensation channel into which opens a milk intake conduit, and a mixing channel into which opens an air intake conduit. The mixing channel is followed by an emulsification chamber which has an outlet opening. In this arrangement, the steam flowing out of the nozzle produces a subatmospheric pressure in the channels connected to its outlet and step-by-step in succession the milk sucked in by the subatmospheric pressure is first mixed with the steam in the condensation channel, then, in the mixing channel, the steam-milk mixture is mixed with the air sucked in by the subatmospheric pressure through the air conduit and finally the mixture of the three components, steam, milk and air, is conducted into the emulsification chamber in which the milk froth is produced in a turbulence zone and subsequently exits through the chamber opening.

Although the above-described devices noticeably facilitate the preparation of milk froth, since their manipulation does not require any particular skill on the part of the user, this advantage is connected with a relatively high amount of technology expenditures since some expensive or precision manufactured components are required. Since in the chambers or channels connected to the outlet of the steam nozzle sudden changes in cross section produce Carnot surge losses once the steam leaves the nozzle and dead water zones downstream of the disturbance locations produce further flow losses within the chamber system, these devices require relatively high steam pressures to compensate for these flow losses and do not furnish a usable froth in conjunction with steam generators which generate only a low steam pressure. Even with high steam pressures their foaming result and the foaming time are dependent within narrow limits from the sucked-in quantity of air and the fat content of the milk.

Once the above-described foaming aids became known and were put to use, novel home coffee and espresso makers were developed in which, because of the systems involved, only small quantities of steam and low steam pressures are available. For the above-described reasons, the prior art foaming aids do not furnish a satisfactory operating result in connection with these devices.

SUMMARY OF THE INVENTION

The present invention is based on the realization that the technical configuration of a foaming aid can be constructed in such a way that the generation of milk froth of optimum quality is possible also with low pressure steam generators and that simultaneously the system can be simplified in such a way that no expensive assemblies, such as mixing chambers or additional subatmospheric pressure channels which surround the steam nozzle or are connected to its outlet are required for the production of milk froth.

To solve this problem, the present invention proposes to arrange a venturi at the outlet end of the steam pipe and to associate an air intake conduit as well as a milk intake conduit with the venturi in such a manner that the open outlet ends of these conduits open directly into the venturi in the zone of greatest steam flow velocity and thus of the greatest subatmospheric pressure.

The open entrance opening of the air intake conduit is here positioned in such a way that, if the venturi is immersed into a vessel filled with milk, the opening remains above the liquid level while the open entrance opening of the milk intake opening lies below the liquid level. Thus, as soon as steam flows through the venturi and the latter is immersed below the liquid level of the milk, air and milk are sucked in already at low steam pressures and are mixed with the steam in the diffusion path of the venturi. The thus resulting three-component mixture of steam, air and milk causes the desired milk froth to be formed at the outlet of the venturi. In order to optimally utilize the low available steam pressures, to create the most stable possible flow conditions, and in order to avoid surge losses as well as flow losses created by disturbance locations, the diffusion path of the venturi is configured as a smooth cone frustum casing without disturbance locations. It is just as possible to have the air intake conduit as well as the milk intake conduit open into the venturi under an angle that is equal to or less than 90° relative to the casing surface of the venturi diffusion path, measured in the direction of steam entrance. The proposed device constitutes a surprisingly simple and simultaneously efficient foaming aid for the production of milk froth. It is uncomplicated and economical in manufacture, it places no special manipulative demands on the user and permits the attainment of optimum froth generation even at low steam pressures, substantially independently of the fat content of the milk.

BRIEF DESCRIPTION OF THE DRAWINGS

The drawing figures depict several embodiments of the invention.

DETAILED DESCRIPTION OF THE PREFERRED EMBODIMENTS

Figure 1:
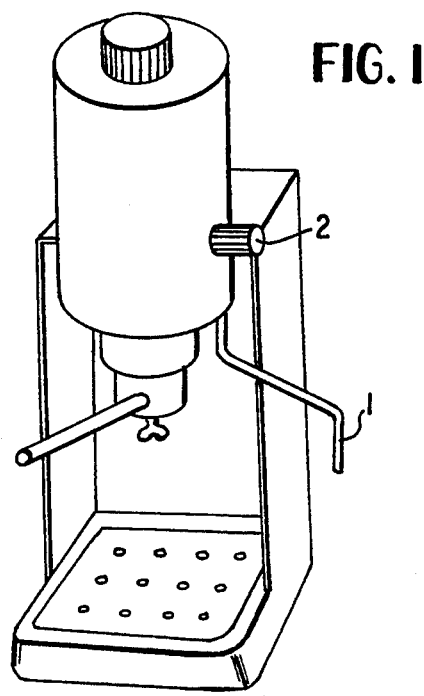
FIG. 1 is a perspective view of an electrically operated espresso machine.

The drawing figures depict only the components that are in themselves parts of the invention or are required to understand the concept of the invention. An illustration of the electrical terminals or steam generators has been dispensed with. All components for the preparation of espresso or steam absent in the drawing figures may have a known configuration.

FIG. 1 shows an electrically operated espresso machine having a steam pipe 1 and a steam quantity controller 2.

Figure 2:
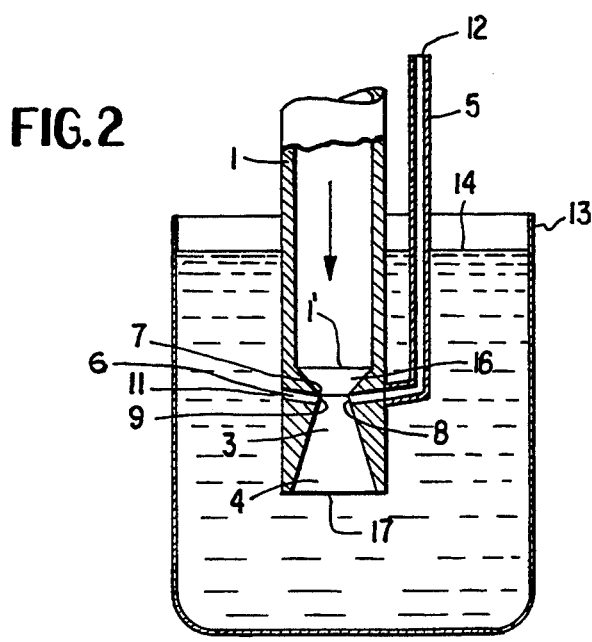
FIG. 2 is a sectional elevation view of a preferred embodiment.

Turning to FIG. 2, the embodiment according to the invention shown therein for the preparation of milk froth operates as follows:

The device equipped with a steam generator and intended for the preparation of milk froth is put into operation in the usual manner. After the boiler generator has reached the desired steam temperature or the steam generator of a flow-through heater system has reached the operating temperature, manual operation of the steam quantity regulator 2 (shown in FIG. 1) releases the discharge of steam from the generator into the steam pipe 1. The steam then flows through steam pipe 1 in the sense of the arrow shown in FIG. 2 and, after leaving a pipe outlet 1', enters a venturi 3. While flowing through venturi 3, the steam is accelerated on an acceleration path 16, attains its greatest velocity in nozzle neck 7 and there creates a zone of greatest subatmospheric pressure. If the venturi 3 is immersed below the liquid level 14 of a vessel 13 filled with milk, the subatmospheric pressure sucks air through the air intake conduit 5 which opens at 8 into venturi 3 in the zone of greatest subatmospheric pressure while the upper open end 12 of the air intake conduit remains above the liquid level 14. Milk is sucked in through milk intake conduit 6 which, at 9, also opens into the venturi 3 in the zone of greatest subatmospheric pressure and whose intake opening 11 is disposed below the liquid level of the milk. Thus the mixture of the three components, steam, air and milk, required to produce the milk froth already forms in the diffusion path 4 of venturi 3 and the desired milk froth appears at the outlet 17 of the venturi.

Figure 3:
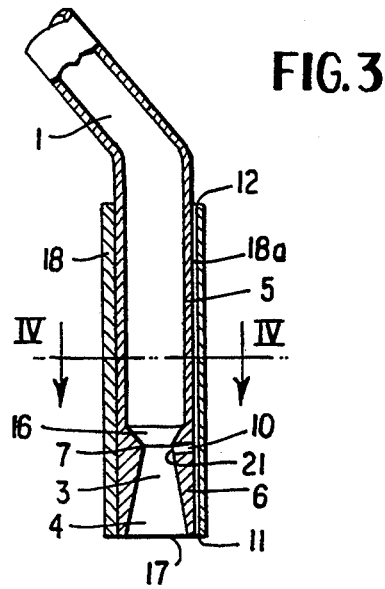
FIG. 3 is a sectional elevational view of another preferred embodiment.
Figure 4:
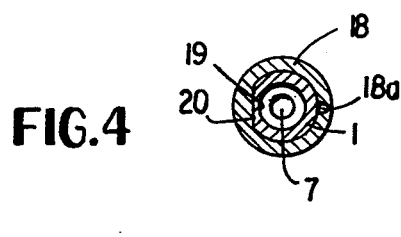
FIG. 4 is a sectional view along line IV—IV of FIG. 3.

In the preferred embodiment of the invention, shown in FIGS. 3 and 4, the end of the steam pipe 1 is configured directly as a venturi 3 and, at the height of the zone where the greatest subatmospheric pressure is created in the venturi, a bore 10 is provided that forms a common entrance channel into the venturi nozzle for the sucked-in air and the sucked-in milk. A sleeve 18 is provided on its interior with a groove 18a that continues from the top of the sleeve to the bottom of the sleeve and forms both the air intake conduit 5 and the milk intake conduit 6. The sleeve 18 is pushed over the end of the steam pipe 1.

The sleeve 18 is positioned on the steam pipe 1 in such a way that the entrance channel 10 of the venturi 3 opens into the groove 18a and thus connects the zone of the greatest subatmospheric pressure in the venturi with the groove 18a. Milk is sucked in through the lower opening 11 formed by the groove 18a, air is sucked in through the upper opening 12 formed by the groove 18a and the two media flow into the venturi 3 through the common entrance channel 10. It is advisable to construct the sleeve 18 so that it can be removed for cleaning and to provide the sleeve as well as the steam pipe with centering devices to ensure proper alignment of the entrance channel with the groove. Such a centering device is constituted by a flattened external face 19 of the steam pipe 1 and a flattened internal face 20 of the sleeve 18. Parts 19 and 20 render the fitting surfaces of the steam pipe 1 and the sleeve 18 unround, ensuring a determined angular orientation between components 1 and 18.

Figure 6:
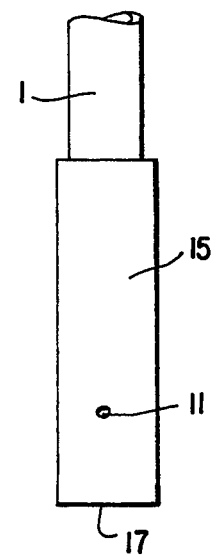
FIG. 6 is an elevational view of the construction shown in FIG. 5.
Figure 5:
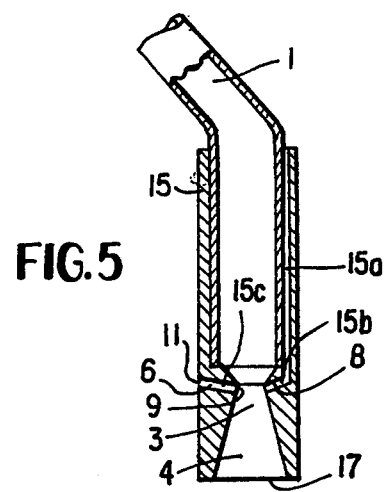
FIG. 5 is a sectional elevational view of a further preferred embodiment.

In the embodiment shown in FIGS. 5 and 6, the venturi 3 is disposed in a separate accessory component 15 which is pushed over the steam pipe 1 and can be connected with the steam pipe by means of a screw or plug-in connection. The connection between steam pipe 1 and accessory component 15 is so shaped that the steam pipe 1 changes essentially without disturbance-creating locations into the acceleration path 16 of the venturi. The accessory component 15 also includes the air intake conduit 5 and the milk intake conduit 6. The air intake conduit 5 is formed by a groove 16a disposed in the upper portion of the accessory component 15 and connected by way of a channel 15b with the zone of greatest subatmospheric pressure in the venturi. The milk intake conduit 6 is formed by a transverse channel 15c which connects the exterior of the accessory component 15 with the zone of greatest subatmospheric pressure in the venturi 3.

Since the superheated steam transfers a considerable amount of its heat to the components of the device through which it flows, it is advisable to manufacture the parts coming in contact with the milk of a material having poor thermal conductivity so as to prevent the milk from baking on.

It will be understood that the above description of the present invention is susceptible to various modifications, changes and adaptations, and the same are intended to be comprehended within the meaning and range of equivalents of the appended claims.

What is claimed is:

1. A device for preparing milk froth comprising
   (a) a steam pipe for carrying hot water steam therein in a flow direction; said steam pipe having a pipe outlet;
   (b) a venturi adjoining said pipe outlet; said venturi including
      (1) an acceleration path adjoining said pipe outlet and narrowing in said flow direction;
      (2) a neck portion adjoining said acceleration path; said neck portion constituting a venturi zone of greatest vacuum in said venturi;
      (3) a diffusion path adjoining said neck portion and widening in said flow direction;
      (4) a venturi outlet constituting an end of said diffusion path;
   (c) an air intake conduit for carrying air therein; said air intake conduit having a terminal portion opening into said neck portion for introducing air into said venturi zone; and
   (d) a milk intake conduit for carrying milk therein; said milk intake conduit having a terminal portion opening into said neck portion for introducing milk into said venturi zone for generating in said diffusion path a stem-air-milk mixture, whereby milk froth is formed at said venturi outlet.

2. The device as defined in claim 1, wherein components contacting milk during operation are of a material having poor thermal conductivity.

3. The device as defined in claim 1, wherein said venturi is formed as an integral, one-piece part with said steam pipe beyond said pipe outlet.

4. The device as defined in claim 3, wherein said terminal portion of said air intake conduit and said terminal portion of said milk intake portion is formed of at least one inlet channel provided in said venturi; said inlet channel being open at an outer surface of said venturi and merging into said neck portion.

5. The device as defined in claim 4, wherein said at least one inlet channel opens into said neck portion at an angle of at most 90° to said flow direction.

6. The device as defined in claim 4, wherein said at least one inlet channel is a single inlet channel constituting said terminal portion of said air intake conduit and said terminal portion of said milk intake conduit.

7. The device as defined in claim 4, wherein said at least one inlet channel comprises a first inlet channel constituting said terminal portion of said air intake conduit and a second inlet channel constituting said terminal portion of said milk intake conduit.

8. The device as defined in claim 4, wherein said venturi has an external circumferential surface; further comprising a sleeve form-fittingly surrounding said surface; parts of said air intake conduit and said milk intake conduit being formed in said sleeve.

9. The device as defined in claim 8, wherein said sleeve is removably mounted on said venturi.

10. The device as defined in claim 8, wherein said sleeve has opposite longitudinal ends and an inner surface; said parts of said air intake conduit and said milk intake conduit being formed by a groove provided in said inner surface of said sleeve; said groove opening into said opposite longitudinal ends and being in communication with said inlet channel.

11. The device as defined in claim 8, further comprising centering means for determining a defined angular position of said venturi and said sleeve relative to one another.

12. The device as defined in claim 1, further comprising an accessory sleeve surrounding said steam pipe; said venturi, said air intake conduit and said milk intake conduit being formed in said accessory sleeve.

13. The device as defined in claim 12, wherein said accessory sleeve is form-fittingly mounted on said steam pipe.

14. The device as defined in claim 13, wherein said accessory sleeve is removably mounted on said steam pipe.

* * * * *